Oct. 28, 1958 M. A. THORNE 2,857,975
VEHICLE HALF AXLE DRIVE ASSEMBLY
Filed Dec. 31, 1953 2 Sheets-Sheet 1
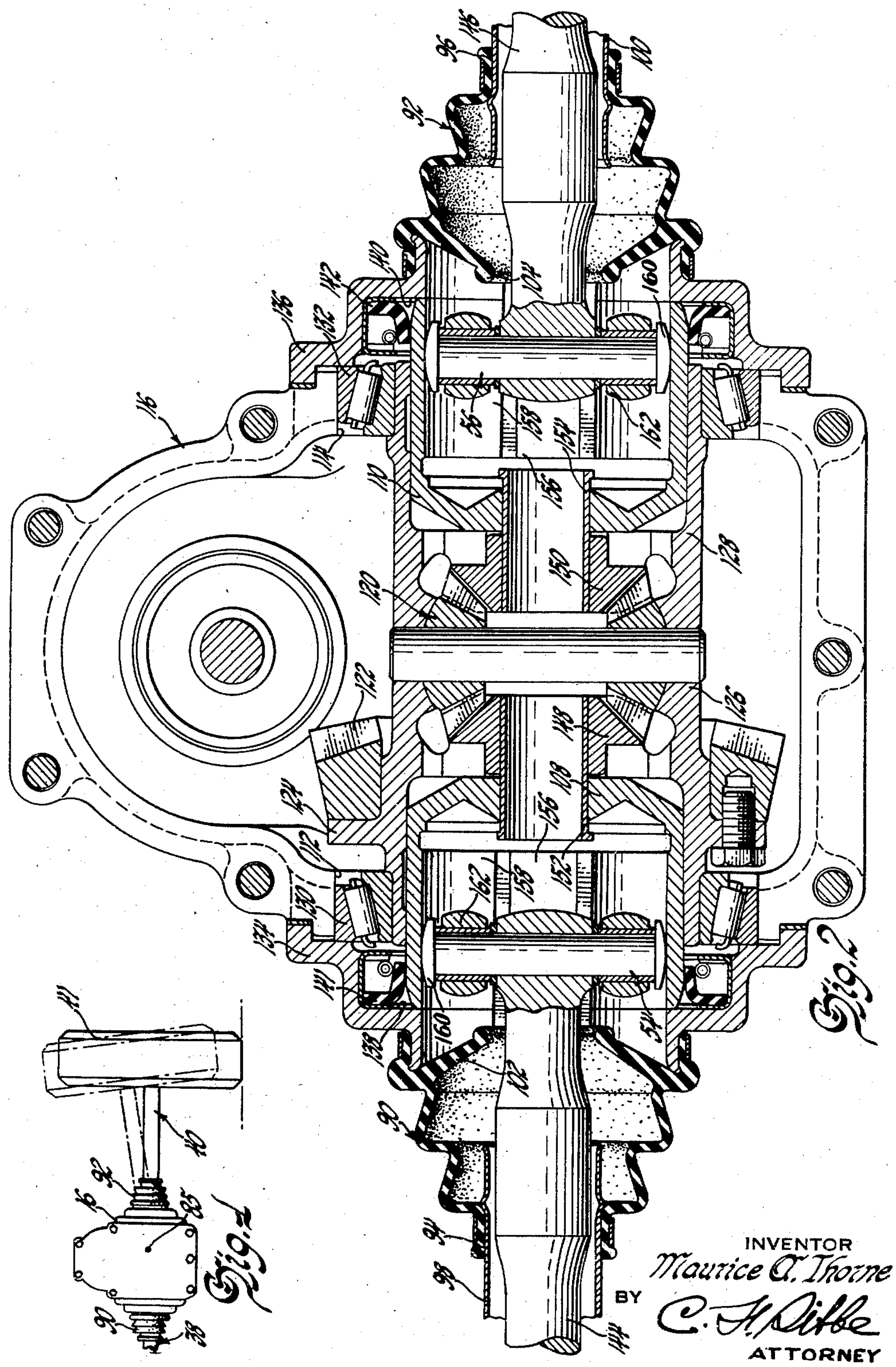

Oct. 28, 1958 M. A. THORNE 2,857,975
VEHICLE HALF AXLE DRIVE ASSEMBLY
Filed Dec. 31, 1953 2 Sheets-Sheet 2
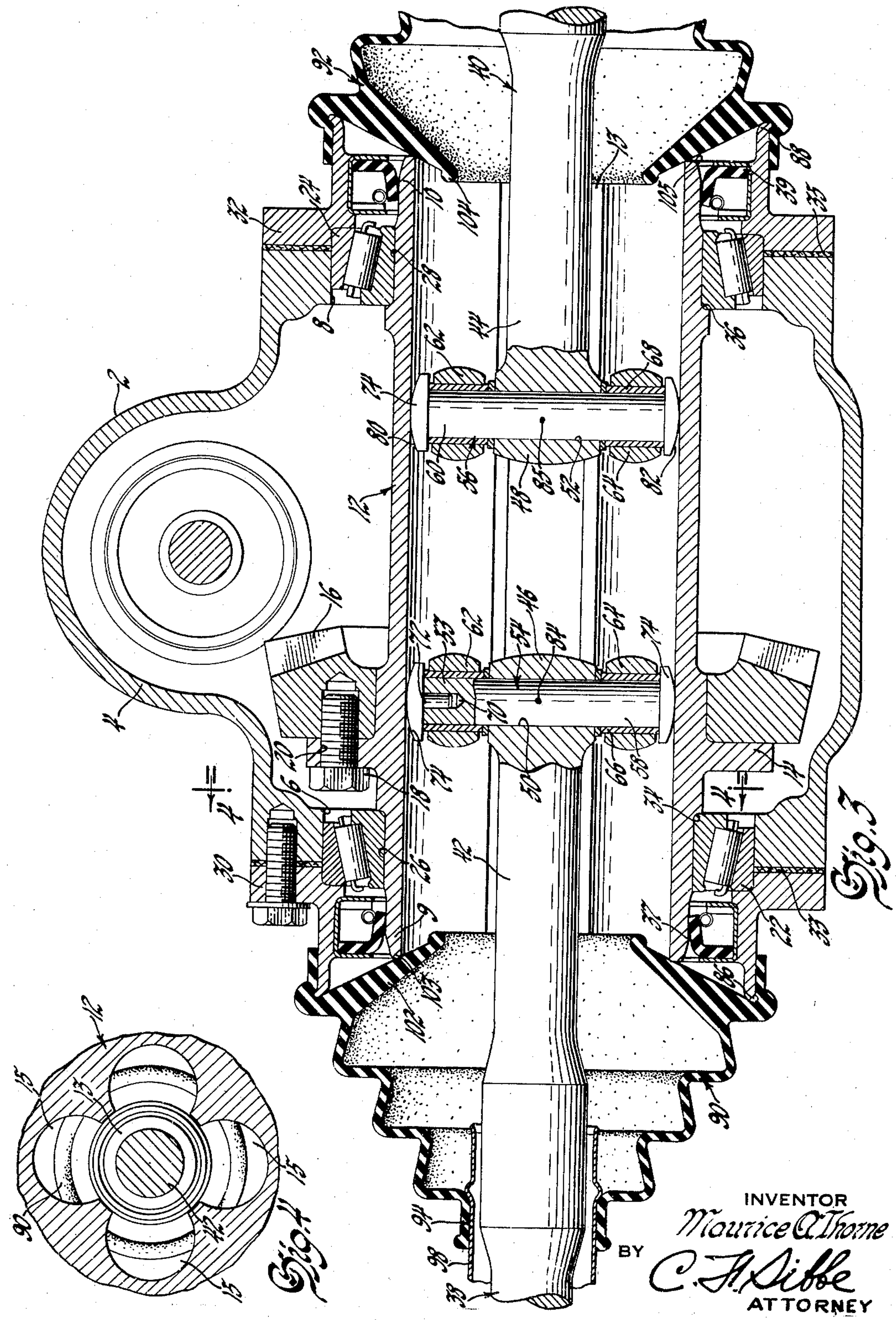

United States Patent Office 2,857,975

Patented Oct. 28, 1958

2,857,975

VEHICLE HALF AXLE DRIVE ASSEMBLY

Maurice A. Thorne, Detroit, Mich., assignor to General Motors Corporation, Detroit, Mich., a corporation of Delaware Application December 31, 1953, Serial No. 401,535

2 Claims. (Cl. 180—73)

This invention relates to final drive mechanisms and more particularly to drive mechanisms wherein power is transmitted to vehicle wheels by swingable rotating half axles.

Final drive mechanisms wherein the wheels are driven by independently swingable half axles are well known in the prior art. However, in the past the length of each axle has been limited by the space available between the lateral extremities of the differential housing and the wheel supports. This space has previously been further reduced because of the necessity of interposing universal joint to accommodate angular movement of each axle responsive to wheel rise and fall. In addition, in many instances, the geometry of motion of the wheels relative to the differential required that a universal joint be provided at either end of each axle for connection respectively with the differential and the wheel, and thus further reduced the total length of the axle shaft. Because of the relative shortness of each axle, an undesirably high degree of angularity resulted from even moderate rise or fall of the driving wheels. Since conventional universal joints are incapable of transmitting power at a constant velocity when operating at excessive angles, it is desirable that the maximum angularity of the shafts, resulting from wheel rise and fall, be restricted to a minimum. While this may obviously be accomplished by increasing the track of the vehicle or by limiting vertical movement of the wheels relative to the chassis, it is desirable that both a normal track width and vertical range of movement of the wheels be maintained.

An object of the present invention is to provide a final drive mechanism of the swing axle type wherein the driven axles are swingable from points in close proximity to the longitudinal mid-line of the vehicle.

Another object is to provide a final drive mechanism having an independent articulated axle engaging each of the wheels, wherein each of the axles is connected to a common driving member so constructed and arranged as to permit substantial increase in the length of the axles to reduce the proportional angularity thereof relative to vertical displacement of the wheel.

A further object is to provide a final drive wherein oppositely extending swingable axles are disposed between a differential drive and the respective wheels, the differential mechanism being so constructed as to permit articulated connection with the axles to be disposed interiorly of the housing.

A still further object is to provide a drive mechanism of the type described wherein the connections between the inner ends of the respective axles and the driving member permit both angular and axial movement of the axle shafts to compensate for vertical displacement of the wheels.

Yet another object is to provide a device of the stated character wherein the total number of supporting bearings is substantially reduced.

These and other objects and advantages of the invention will become more fully apparent as reference is had to the accompanying specification and drawings wherein:

Fig. 1 is a fragmentary front elevational view showing the relative arrangement of the differential, swinging axle and one wheel, the range of movement thereof being illustrated in dotted lines.

Fig. 2 is a sectional front elevational view of one embodiment of the invention showing the form and arrangement thereof as applied to a conventional differential mechanism.

Fig. 3 is a sectional front elevational view of another embodiment of the invention showing the construction and arrangement of the power transmitting mechanism and associated swinging axles, certain parts being broken away to show the construction thereof, and Fig. 4 is a fragmentary sectional elevational view looking in the direction of arrows 4—4 of Fig. 3.

Referring now to the drawings and particularly Fig. 3, there is illustrated a final drive housing 2 having an open front bounded by a milled perimetral flange 4 to which is secured the housing of a suitable vehicle transmission mechanism, not shown. At its lateral sides, housing 2 is provided with transversely aligned circular apertures 6 and 8 through which extend the terminal extremities 9 and 10 of an annular sleeve-like axle driving member 12. As seen best in Fig. 4, member 12 is circular in external cross section while the interior thereof is provided with a central circular bore 13 and four equally circumferentially spaced circular bores 15 which are radially co-extensive with the central bore 13. Each of the bores 13 and 15 extend axially through the entire length of member 12. Formed intermediately on the outer periphery of member 12 is an external circular flange 14 adapted to permit mounting of a conventional bevel ring gear 16. Ring gear 16 is secured in the position shown by a plurality of machine bolts 18 which extend through apertures 20 formed at circumferentially spaced intervals in flange 14. It will be understood that ring gear 16 is engageable by a suitable pinion or bevel gear, not shown, which, in turn, is driven by the vehicle power plant through the medium of a transmission mechanism, previously referred to. In order to rotatably support driving member 12 in housing 2, a pair of anti-friction roller bearing assemblies 22 and 24 are disposed between the apertures 6 and 8 and the reduced outer peripheral portions 26 and 28 of member 12. Bearings 22 and 24 are retained in position by bearing retainer end plates 30 and 32 which are, in turn, threadably secured against the machined lateral faces 33 and 35 bounding the apertures 6 and 8 of housing 2. Shoulders 34 and 36 formed on the periphery adjacent portions 26 and 28 restrict axial inward movement of the bearings, which thus provide both radial and axial support for member 12. Positioned immediately axially outwardly from bearing assemblies 22 and 24, are annular oil seals 37 and 39 which serve to prevent leakage of oil from the interior of housing 2 through bearings 22 and 24. Extending inwardly from opposite sides of housing 2 into the central bore 13 of member 12 are a pair of half axles or swing axles 38 and 40 which are suitably connected at their outer ends to vehicle driving wheels 41. At their inner ends 42 and 44, axles 38 and 40 are formed with enlarged heads 46 and 48 having transversely extending bores 50 and 52 formed therein. Bores 50 and 52 are adapted to rotatably support wrist pins 54 and 56, the end portions 58 and 60 of which extend outwardly beyond bores 50 and 52. Outer portions 58 and 60 of pins 54 and 56 are surrounded by sleeve-like ring members 62 and 64 of semi-spherical outer configuration. Interposed between the respective ends of the pins and ring members 62 and 64 are suitable anti-friction bearings 66 and 68. At their terminal extremities, outer portions 58 and 60 are provided with axially aligned bores 70 which are adapted to receive the stems 72 of button members 74. Rings 62 and 64 and buttons 74 slidably engage one of the pairs of diametrically opposed bores 15 which are formed integrally in the interior of member 12, as previously mentioned. Since grooves 15 extend through the entire length of member 12, it will be apparent that wrist pins 54 and 56 disposed in shafts 38 and 40 may slide axially from the outer extremity of member 12 inwardly toward each other to substantially the longitudinal centerline of the housing. As seen in Fig. 3, the outer surfaces 80 and 82 of button 74 are semispherical in profile. Thus, when the shafts 38 and 40 are inclined upwardly or downwardly from the horizontal, the wrist pins 54 and 56 swing about the points 84 and 85 to describe arcs substantially similar to the curved profile of the buttons. It will be apparent that fore and aft rocking movement of the shafts 38 and 40 takes place about the vertical pivotal axis provided by wrist pins 54 and 56. Since shafts 38 and 40 may be swung above and below the horizontal as well as fore and aft of the normal lateral axis, it will be seen that driving engagement between member 12 and half axles 38 and 40 is effective to rotate shafts 38 and 40 when the latter are disposed in angular relation to driving member 12. In order to seal the operating parts of the universal joint construction against the entrance of dirt, bearing retainer end plates 30 and 32 of housing 2 are provided with out turned peripheral lips 86 and 88 over which are disposed generally conical flexible boots 90 and 92. At their outer ends, boots 90 and 92 are formed with reduced openings 94 and 96 which surroundingly embrace sheet metal tubes 98 and 100. Tubes 98 and 100, in turn, are disposed in concentric relation about axle shafts 38 and 40. Boots 90 and 92 are preferably molded to provide a pleated mid-section capable of being readily deformed as the axle shafts 38 and 40 move angularly. At their inner enlarged ends, boots 90 and 92 are provided with radially inwardly and forwardly extending circumferential ribs 102 and 104 which resiliently overlie the terminal edges 103 and 105 of member 4.

As will be apparent from the drawings, the entire driving member 12 is positively rotated by ring gear 16. Consequently, no differential action is provided and variation in turning rate of the vehicle wheels is compensated for entirely by wheel slippage. It will, of course, be understood that this type of final drive is primarily, although not exclusively, adapted for use in racing vehicles and others wherein turning is relatively infrequently required. By elimination of the differential assembly, member 12 may extend continuously through the housing 2 and thus permit the inner ends 42 and 44 of shafts 38 and 40 to be extended inwardly to substantially the longitudinal centerline of the housing. Consequently, the distance from points 84 and 85, about which the axles swing, to the vertical planes of movement of the wheels is substantially increased. Therefore, if a wheel is displaced, as for example, a vertical distance of six inches, the angle of inclination assumed by the respective axle will be substantially less than would be possible when the universal joint connection is laterally disposed outwardly beyond the side wall of the housing. Since the ability of universal joints to transmit motion at constant velocity is appreciably reduced as the angle of inclination of the axle increases, the advantage incident to the present construction will be apparent.

In Fig. 2, there is illustrated one form of the invention wherein separate annular cup-shaped members or pots 108 and 110 are rotatably disposed in laterally aligned bored openings 112 and 114 formed in the differential housing 116. Interposed between the pots 108 and 110 is a conventional differential mechanism 120 and associated ring gear 122. Ring gear 122 is adapted to be driven by a suitably positioned bevel gear which forms a part of the vehicle transmission, not shown. In the modification shown, ring gear 122 is threadably secured in concentric relation with the circular flange 124 formed integrally on the outer periphery of an annular sleeve member having left and right portions 126 and 128, respectively. Member 126, 128 is rotatably supported on anti-friction tapered roller bearing assemblies 130 and 132 which are retained in bored openings 112 and 114 by bearing retainer end plates 134 and 136, respectively. Pots 108 and 110 are rotatably disposed interiorly of the outer portions of annular member 126, 128 and are retained against axial movement therein by intermediate radially flanged portions 138 and 140 of end plates 134 and 136. To prevent leakage of differential lubricant past bearings 130 and 132, suitable oil seals 141 and 142 are disposed between the outer forward ends of pots 108 and 110 and the intermediate radially flanged portions 138 and 140 of plates 134 and 136. To provide differential driving of the axle shafts 144 and 146, pots 108 and 110 are connected to differential gears 148 and 150 by splined tubular members 152 and 154. At their inner ends, half axles 144 and 146 are provided with universal connections identical with those previously described with reference to the embodiment of Fig. 3. Each pot 108 and 110 is similarly provided with a central axially extending bore 156 and four circumferentially spaced bores 158 which generally conform to the configuration of buttons 160 and ring members 162 and are effective to provide driving engagement between axle shafts 144 and 146 and pots 108 and 110 in the same manner as previously described with reference to Fig. 1. It will, of course, be apparent that location of the differential mechanism limits depth of pots 108 and 110 and, therefore, restricts the amount of lateral inward movement of the universal connections as compared to a construction wherein no differential action is desired. However, it will be obvious that this embodiment nevertheless permits considerably extended axle shafts, as compared to conventional structures heretofore available, while retaining the advantages of differential driving of the wheels. In addition, it should also be noted that but a single bearing support is required at either side of the housing, since the bearings 134 and 136 support both the differential mechanism and the universal joints. As is apparent from Figure 2 taken with Figure 4, the annular internal walls of the bearing caps or retainers 134, 136 are flush with the root surfaces of the splines formed by the bores 15. Thus, the universal connections can be made simply by inserting the shafts 144, 146 into the pots from points axially outward thereof.

From the foregoing it will be seen that the present invention provides a simplified and highly compact swing axle drive mechanism. The construction not only substantially reduces the maximum angularity of operation of the half axles but in addition considerably reduces the complexity of structure, as compared to devices heretofore available.

While but two embodiments have been shown and described, it is manifest that other changes and modifications may be made therein without departing from the invention. It will, therefore, be understood that it is not intended to limit the invention to the embodiments shown, but only by the scope of the claims which follow.

I claim:

1. A final drive mechanism of the type adapted to transmit power to vehicle road wheels comprising a housing having laterally spaced bearings, an annular rotatable member extending through said housing and having its opposite ends supported by said bearings, a ring gear secured to said member and effective to drive the same, a differential gear mechanism carried centrally in said annular member, a pair of cup-shaped members rotatably supported in opposite ends of said annular member, means operatively connecting each of said cup-shaped members to said differential gear mechanism, means secured to said housing for preventing axial displacement of said bearings and said cup-shaped members, means forming axially directed splines interiorly of said cup-shaped members, a pair of axle shafts having their outer ends connected to said wheels, and a universal joint connection on the inner end of each of said axles engageable with said splines, said displacement-preventing means having annular internal walls flush with the root surfaces of the splines of said cup-shaped members whereby said universal joint connections are axially inwardly insertable into said cup-shaped members.

2. A final drive mechanism of the type adapted to transmit power to vehicle road wheels comprising a housing having openings formed in the laterally opposite sides thereof, an anti-friction bearing disposed in each of said openings, an annular rotatable member extending through said housing and having its opposite ends supported by said bearings, a ring gear secured to said annular member and effective to drive the same, a differential gear mechanism carried centrally in said annular member, a pair of cup-shaped members rotatably supported in opposite ends of said annular member, a pair of bearing retainer caps secured against the lateral faces of said housing to retain said bearings and said cup-shaped members against axial movement, means operatively connecting each of said cup-shaped members to said differential gear mechanism, each of said cup-shaped members having axially directed splines formed interiorly thereof, a pair of axle shafts having their outer ends connected to said wheels, and a universal joint connection at the inner end of each of said axles engageable with said spline, said bearing caps having annular internal walls flush with the root surfaces of the splines of said cup-shaped members whereby said universal joint connections are axially inwardly insertable into said cup-shaped members.

References Cited in the file of this patent

UNITED STATES PATENTS

| | | |
|---|---|---|
| 942,087 | Lipe | Dec. 7, 1909 |
| 1,921,274 | Warner | Aug. 8, 1933 |
| 1,989,446 | Ganz | Jan. 29, 1935 |
| 2,007,670 | Zubaty | July 9, 1935 |
| 2,057,875 | Benham | Oct. 20, 1936 |
| 2,344,380 | Wilfert et al. | Mar. 14, 1944 |
| 2,716,461 | MacPherson | Aug. 30, 1955 |

FOREIGN PATENTS

| | | |
|---|---|---|
| 404,991 | France | Nov. 4, 1909 |